(12) United States Patent
Matsudaira et al.

(10) Patent No.: US 9,047,177 B2
(45) Date of Patent: Jun. 2, 2015

(54) MEMORY SYSTEM, DATA MANAGEMENT METHOD, AND COMPUTER

(75) Inventors: Hiroki Matsudaira, Kanagawa (JP); Ryuji Nishikubo, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 296 days.

(21) Appl. No.: 13/609,663

(22) Filed: Sep. 11, 2012

(65) Prior Publication Data
US 2013/0246689 A1  Sep. 19, 2013

(30) Foreign Application Priority Data
Mar. 16, 2012  (JP) .................... 2012-060090

(51) Int. Cl.
*G06F 12/00* (2006.01)
*G06F 12/02* (2006.01)

(52) U.S. Cl.
CPC ...... *G06F 12/0246* (2013.01); *G06F 2212/401* (2013.01); *G06F 2212/7201* (2013.01); *G06F 2212/7207* (2013.01)

(58) Field of Classification Search
USPC ........... 711/103, 112, 113, 170, 154, E12.002
See application file for complete search history.

(56) References Cited

U.S. PATENT DOCUMENTS

| | | | |
|---|---|---|---|
| 6,857,045 B2 * | 2/2005 | Galbraith et al. | 711/118 |
| 8,806,108 B2 * | 8/2014 | Suzuki et al. | 711/103 |
| 2003/0058873 A1 * | 3/2003 | Geiger et al. | 709/247 |
| 2010/0037009 A1 | 2/2010 | Yano et al. | |
| 2010/0037010 A1 | 2/2010 | Yano et al. | |
| 2010/0037011 A1 | 2/2010 | Yano et al. | |
| 2010/0037012 A1 | 2/2010 | Yano et al. | |
| 2013/0042057 A1 * | 2/2013 | Sinclair et al. | 711/103 |

FOREIGN PATENT DOCUMENTS

| | | |
|---|---|---|
| JP | 5-21256 B2 | 3/1993 |
| JP | 10-210066 A | 8/1998 |
| JP | 2001-93235 A | 4/2001 |
| JP | 4533968 B2 | 9/2010 |
| WO | WO 2009/084724 A1 | 7/2009 |

OTHER PUBLICATIONS

U.S. Appl. No. 13/599,087, filed Aug. 30, 2012, Yonezawa, et al.

* cited by examiner

*Primary Examiner* — Pierre-Michel Bataille
(74) *Attorney, Agent, or Firm* — Oblon, McClelland, Maier & Neustadt, L.L.P.

(57) ABSTRACT

According to one embodiment, a memory system includes a non-volatile memory, a volatile memory, a controller, and a compression/decompression processor. When data transmission is performed through the volatile memory between a host apparatus and the non-volatile memory, the controller updates management information stored in the volatile memory. In addition, the compression/decompression processor compresses the management information in the case where a first condition is satisfied, and decompresses the compressed management information in the case where a second condition is satisfied. The controller stores the compressed management information in the non-volatile memory.

14 Claims, 13 Drawing Sheets

CLUSTER MANAGEMENT TABLE 31

| BLOCK NUMBER | VALID CLUSTER NUMBER |
|---|---|
| 0 | 0 |
| 1 | UPPER LIMIT VALUE U |
| 2 | UPPER LIMIT VALUE U |
| 3 | 2 |
| ⋮ | ⋮ |
| 99 | 0 |

···000_0000 → 0
···000_0000 → 10
···000_0111 → 10
···000_0110 → "11"000_0110
⋮ → ⋮
···000_0000 → 0

MEMORY SYSTEM, DATA MANAGEMENT METHOD, AND COMPUTER

CROSS-REFERENCE TO RELATED APPLICATIONS

This application is based upon and claims the benefit of priority from Japanese Patent Application No. 2012-060090, filed on Mar. 16, 2012; the entire contents of which are incorporated herein by reference.

FIELD

Embodiments described herein relate generally to a memory system, a data management method, and a computer.

BACKGROUND

Recently, a capacity of NAND flash memory which is a non-volatile semiconductor storage device has been increased, and a solid state drive (SSD) as a memory system equipped with the NAND flash memory has attracted attention.

In an SSD of the related art, a management table on volatile memory, as it is, is stored in NAND flash memory which is non-volatile memory. However, in the case where the management table has a large size, a long time is taken to write data in the NAND flash memory and to read data from the NAND flash memory. Therefore, it is preferable that the reading and writing of the management table between the volatile memory and the non-volatile memory be performed in a short time.

DETAILED DESCRIPTION

According to embodiments of the present invention, there are provided memory systems. The memory system includes a non-volatile memory configured to store management information and a volatile memory configured to store at least one part of the management information. In addition, the memory system includes a controller configured to store at least one part of the management information. The controller loads the management information stored in the non-volatile memory into the volatile memory at first timing, and saves the management information loaded in the volatile memory into the non-volatile memory at second timing. The controller performs data transmission through the volatile memory between a host apparatus and the non-volatile memory, and updates the management information stored in the volatile memory while performing the data transmission based on the management information. In addition, the memory system includes a compression/decompression processor configured to compress the management information in the case where a first condition is satisfied and to decompress the compressed management information in the case where a second condition is satisfied. In addition, the controller stores the compressed management information in the non-volatile memory.

Hereinafter, memory systems, data management methods, and computers according to embodiments will be described in detail with reference to the attached drawings. In addition, the present invention is not limited to the embodiments.

(First Embodiment)

First, concept of a data compression/decompression (expansion) process of a memory system according to an embodiment will be described. In the embodiment, a solid state drive (SSD) as a memory system compresses a management table (logical-physical translation table 20X described later) and, after that, stores the management table in NAND flash memory.

Figure 1:
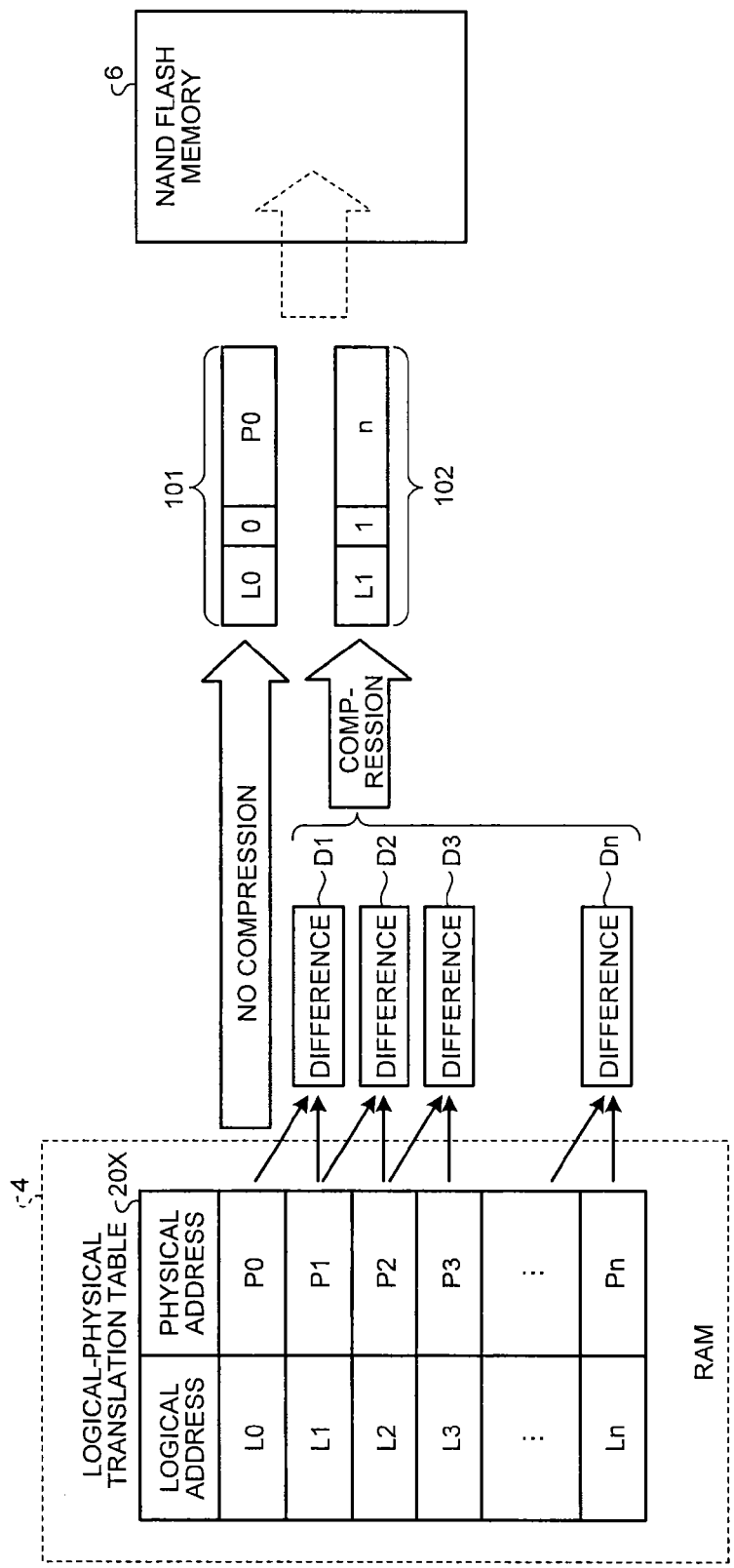
FIG. 1 is a diagram for describing concept of a data compression process of a memory system according to a first embodiment.

FIG. 1 is a diagram for describing concept of a data compression process of a memory system according to a first embodiment. A memory system (SSD 1 described later) includes a random access memory (RAM) 4 and a NAND flash memory 6 which is non-volatile memory. In addition, an SSD 1 according to the embodiment has a function (management data compression/decompression processor 5A described later) of compressing a logical-physical translation table 20X in the RAM 4 to write the logical-physical translation table 20X in the NAND flash memory 6 and decompressing (expanding) the logical-physical translation table 20X in the NAND flash memory 6 to write the logical-physical translation table 20X in the RAM 4.

The logical-physical translation table 20X represents a correspondence relation between logical addresses (Logical Block Addresses: LBAs) L0 to Ln (n is a natural number) designated by a host apparatus and physical addresses P0 to Pn designating storage positions of data in the NAND flash memory 6. In the logical-physical translation table 20X in FIG. 1, the logical address L0 corresponds to the physical address P0; and the logical address L1 corresponds to the physical address P1. In addition, the logical address Ln (n is an integer of 0 or more) corresponds to the physical address Pn.

In the SSD 1, the management of the logical-physical translation table 20X is performed on the RAM 4. When the logical-physical translation table 20X of the RAM 4 is allowed to be stored in the NAND flash memory 6, the management data compression/decompression processor 5A performs a compression process on the logical-physical translation table 20X. Next, the management data compression/decompression processor 5A stores the compressed logical-physical translation table 20X in the NAND flash memory 6.

More specifically, the management data compression/decompression processor 5A calculates a difference between the X-th (X is an integer of 0 to (n−1)) physical address and the (X+1)-th physical address in the logical-physical translation table 20X. For example, a difference D1 is calculated as a difference between the first physical address P0 and the second physical address P1 in the logical-physical translation table 20X. In addition, a difference D2 is calculated as a difference between the second physical address P1 and the third physical address P2, and a difference D3 is calculated as a difference between the third physical address P2 and the fourth physical address P3. Similarly, a difference Dn is calculated as a difference between the (n−1)-th physical address P(n−1) and the n-th physical address Pn.

The management data compression/decompression processor 5A does not perform the compression process on the first physical address P0. In this case, the management data compression/decompression processor 5A generates data 101 in correspondence with the logical address L0, information "0" indicating that compression has not been performed, and the physical address P0.

In addition, the management data compression/decompression processor 5A performs the compression process on the physical address of which the difference is "1" with respect to the one-preceding physical address. More specifically, the management data compression/decompression processor 5A extracts the physical address of which the difference is "1" with respect to the one-preceding physical address from the logical-physical translation table 20X. Next, the SSD 1 calculates how many times "1" consecutively occurs in the logical-physical translation table 20X. For example, in the case where the physical addresses P0 to Pn are sequentially consecutive data, all the differences D1 to Dn are "1". In this case, the SSD 1 determines that "1" consecutively occurs n times. In other words, the SSD 1 calculates "n" as a consecution number of sequentially consecutive addresses. Next, the management data compression/decompression processor 5A generates data 102 in correspondence with the logical address L1, information "1" indicating that compression has been performed, and information indicating "n". Next, the management data compression/decompression processor 5A stores the data 101 and 102 in the NAND flash memory 6.

In addition, in the case where the management data compression/decompression processor 5A is to read the data 101 and 102 from the NAND flash memory 6 and to expand the data 101 and 102 in the RAM 4, the management data compression/decompression processor 5A performs an decompression process on the data 101 and 102 and decompresses the data 101 and 102 in the RAM 4. At this time, the management data compression/decompression processor 5A performs the decompression process on the data 101 and 102 in the order reverse to the order of the compression process.

In addition, the management data compression/decompression processor 5A does not perform the compression process on the physical address of which the difference is not "1" with respect to the one-preceding physical address. In this case, the management data compression/decompression processor 5A generates data in correspondence with the logical address, information "0" indicating that compression is not performed, and the physical address. In addition, the management data compression/decompression processor 5A does not perform the compression process on the physical address in the case where the consecution number of the difference "1" is less than 2.

In this manner, the SSD 1 reduces the data size of the logical-physical translation table 20X by using the compression process and performs writing in the NAND flash memory 6, so that it is possible to shorten a write time and a read time with respect to the NAND flash memory 6.

Figure 2:
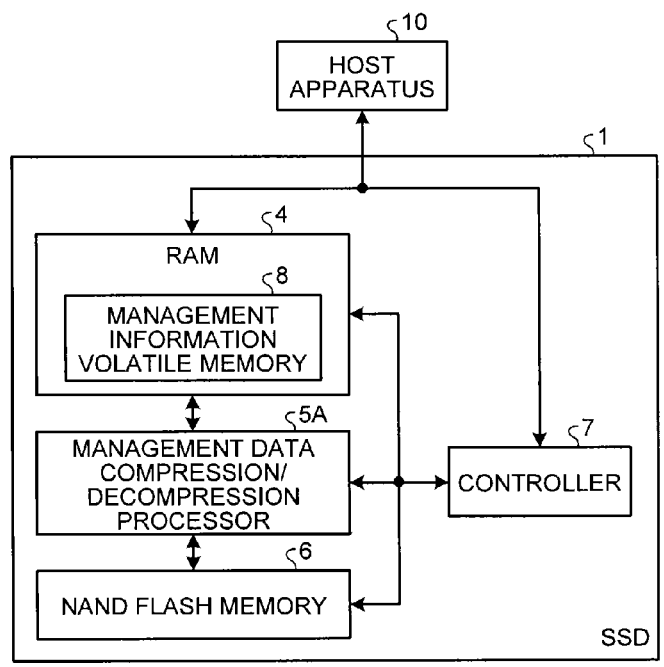
FIG. 2 is a block diagram illustrating an example of a configuration of an SSD according to the first embodiment.

FIG. 2 is a block diagram illustrating an example of a configuration of an SSD according to the first embodiment. The SSD 1 as a semiconductor storage device includes the RAM 4 which includes a management information volatile memory 8, the NAND flash memory 6 which actually stores data, the management data compression/decompression processor 5A, and the controller 7.

The RAM 4 is connected to a host apparatus 10, the controller 7, and the management data compression/decompression processor 5A. The management data compression/decompression processor 5A is connected to the RAM 4, the NAND flash memory 6, and the controller 7. In addition, the NAND flash memory 6 is connected to the management data compression/decompression processor 5A and the controller 7. In addition, the controller 7 is connected to the host apparatus 10, the RAM 4, the management data compression/decompression processor 5A, and the NAND flash memory 6.

The RAM 4 is memory such as SRAM, DRAM, or FeRAM. The RAM 4 temporarily stores data which are transmitted from the host apparatus 10 and transmits the stored data through the management data compression/decompression processor 5A to the NAND flash memory 6. In addition, if data of which reading is requested from the host apparatus 10 are read from the NAND flash memory 6, the RAM 4 temporarily stores the read data. The data which are read from the NAND flash memory 6 and temporarily stored in the RAM 4 are transmitted to the host apparatus 10.

In addition, the management information volatile memory 8 stores the logical-physical translation table 20X representing the correspondence relation indicating which physical address of the NAND flash memory 6 the data designated with the logical address is written in. The logical-physical translation table 20X is a translation table representing a correspondence relation between a logical address designated by the host apparatus 10 and a physical address (storage position) of the NAND flash memory 6. The logical-physical translation table 20X is expanded (loaded) from the NAND flash memory 6 to the RAM 4 at predetermined timing such as a starting time of the SSD 1. In addition, in the case where the correspondence relation between the logical address and the physical address is updated according to data writing, data erasing, or the like of the NAND flash memory 6, the logical-physical translation table 20X expanded (loaded) in the RAM 4 is updated.

In addition, the timing when the logical-physical translation table 20X is written in the NAND flash memory 6 is, for example, a time before the SSD 1 is normally powered off (STANDBY), a time when non-volatilization of data is performed (a time of execution of a command "FLUSH"), a time when the logical-physical translation table 20X is not allowed to be received in the RAM 4, and the like. In the embodiment, just before the logical-physical translation table 20X is stored in the NAND flash memory 6, the data size thereof in the RAM 4 is compressed by using a predetermined compression method, and after that, the logical-physical translation table 20X is stored in the NAND flash memory 6.

The management data compression/decompression processor 5A performs the compression process on the logical-physical translation table 20X of the RAM 4 and stores the compressed logical-physical translation table 20X in the NAND flash memory 6. In addition, the management data compression/decompression processor 5A performs the decompression process on the logical-physical translation table 20X of the NAND flash memory 6 and decompresses the decompressed (expanded) logical-physical translation table 20X in the RAM 4.

The controller 7 controls the RAM 4, the NAND flash memory 6, and the management data compression/decompression processor 5A. The controller 7 writes data in the NAND flash memory 6 and reads data from the NAND flash memory 6 by using the logical-physical translation table 20X of the RAM 4.

More specifically, the controller 7 acquires the logical-physical translation table 20X stored in the NAND flash memory 6 into the RAM 4 at predetermined timing (a starting time or the like) and stores the logical-physical translation table 20X of the RAM 4 in the NAND flash memory 6 at predetermined timing. In addition, the controller 7 performs data transmission through the RAM 4 between the host apparatus 10 and the NAND flash memory 6. In addition, during the data transmission, the controller 7 updates the logical-physical translation table 20X in the RAM 4 and the NAND flash memory 6 and performs data management of the RAM 4 and the NAND flash memory 6 based on the logical-physical translation table 20X.

For example, in the case where data are to be written in the NAND flash memory 6, the controller 7 converts the logical address into the physical address which is a storage position in the NAND flash memory 6. Next, the controller 7 transmits a write command including the converted physical address to the NAND flash memory 6.

The SSD 1 receives read/write commands through an interface (not illustrated) from the host apparatus 10. The interface between the host apparatus 10 and the SSD 1 is in accordance with, for example, a serial ATA (SATA) standard, but the present invention is not limited thereto. The management data compression/decompression processor 5A may be mounted in a hardware manner, or it may be mounted as a firmware module which is executed by the controller 7.

The NAND flash memory 6 includes a memory cell array where a plurality of non-volatile memory cells are arranged in a matrix shape and a peripheral circuit for controlling write, read, and erase operations with respect to the memory cell array. The memory cell array is configured by arranging a plurality of blocks, each of which is a minimum unit for data erasing. Each block is configured by arranging a plurality of pages, each of which is a minimum unit for data writing and reading. Each memory cell may be configured so as to store 1 bit, or each memory cell may be configured so as to store 2 bits or more. In the NAND flash memory 6, rewriting with respect to the same page in the block is not performed if the entire block including the associated page is not erased at one time.

The data written from the host apparatus 10 in the SSD 1 are stored by a predetermined management unit in the NAND flash memory 6. The consecutive addresses on a logical address space are defined as a unit of logical-physical translation (translation of a logical address into a physical address), and the consecutive addresses are collectively allocated to a physical area on the NAND flash memory 6. A plurality of sectors where the logical addresses consecutively occur are sequentially disposed in the management unit. Although the size of the management unit is arbitrary, for example, the size of the management unit may be coincident with a page size or a block size of the NAND flash memory 6 or a cluster size or the like of a file system employed by the host apparatus 10. In addition, the cluster size is equal to or larger than the sector size.

In the case where the updated data which are written from the host apparatus 10 are not aligned with the management unit, the data which are written in an area having a size of the management unit on the NAND flash memory 6 in advance and the updated data which are newly written and of which the size is smaller than the size of the management unit are merged on the RAM 4, so that the data in the management unit are produced, and the data are written in an empty area of the NAND flash memory 6 (read-modify-write). Where the data written from the host apparatus 10 are written in the NAND flash memory 6 is dynamically changed, and thus the correspondence relation is managed by the logical-physical translation table 20X. For example, a logical block address (LBA) formed by attaching a serial number starting from 0 in a sector unit to the logical capacity is employed as the logical address.

Herein, the correspondence relation between the LBAs aligned by the management units and data areas allocated to the management units on the NAND flash memory will be described. Although the logical address which is designated through writing request by the host apparatus 10 is a sector unit, in the SSD 1, the logical address is aligned by the size of the management unit (for example, the cluster size). Next, the sectors corresponding to the LBAs which consecutively occur in the management unit are collectively stored in the area of the management unit in the NAND flash memory 6. For example, in the case where the size of the management unit is equal to the cluster size, a plurality of sectors corresponding to the LBAs aligned by the cluster size are written in the area corresponding to the cluster size of the NAND flash memory 6.

Figure 3:
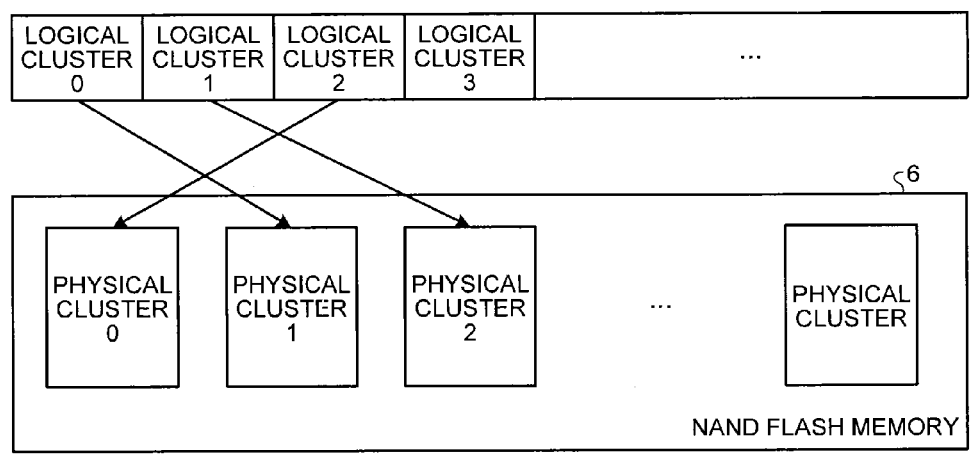
FIG. 3 is a diagram illustrating a correspondence relation between a logical cluster and a physical cluster.

In the SSD 1, a correspondence relation between a logical address of a logical cluster and a physical address of a physical cluster is managed by using the logical-physical translation table 20X. FIG. 3 is a diagram illustrating the correspondence relation between the logical cluster and the physical cluster.

The column of the logical cluster is a column of the sector viewed from the host apparatus 10, and data corresponding to the logical cluster are stored as a physical cluster in the NAND flash memory 6. In other words, the data which are written in units of a logical cluster from the host apparatus 10 may be allocated to the physical cluster in the NAND flash memory 6. At this time, the column of the physical cluster is not necessarily the same column of the logical cluster. Therefore, the correspondence relation (correspondence table) between the logical address and the physical address is stored in the logical-physical translation table 20X. In other words, the logical-physical translation table 20X stores information as to which logical cluster is written in which physical cluster in the NAND flash memory 6.

For example, in the logical-physical translation table 20X described with reference to FIG. 1, the values obtained by aligning the logical addresses designated by the host apparatus 10 by units of a logical cluster and the values obtained by aligning the physical addresses of the NAND flash memory 6 by units of a physical cluster unit are listed in correspondence with each other. Therefore, in the logical-physical translation table 20X, logical cluster numbers are registered as logical addresses, and physical cluster numbers are registered as physical addresses. In addition, in the logical-physical translation table 20X, the logical address may not be registered. In this case, for example, memory addresses of the physical addresses become the logical addresses.

In many cases, the data of which writing into the SSD 1 is requested from the host apparatus 10 are consecutive data. Particularly, in the case where a system configured by using the host apparatus 10 and the SSD 1 is a PC (Personal Computer) system, a bundle (sequential write) of consecutive data of document files, image data, and moving picture data are requested as a writing unit from the host apparatus 10. At this time, the SSD 1 stores information on where the to-be-written data are written by units of a logical cluster in the physical cluster of the NAND flash memory 6, in the logical-physical translation table 20X. Next, the logical-physical translation table 20X is stored in the NAND flash memory 6 at predetermined timing. At this time, in the embodiment, the compression process is performed on the logical-physical translation table 20X.

(First Compression Process of Logical-Physical Translation Table)

Figure 4:
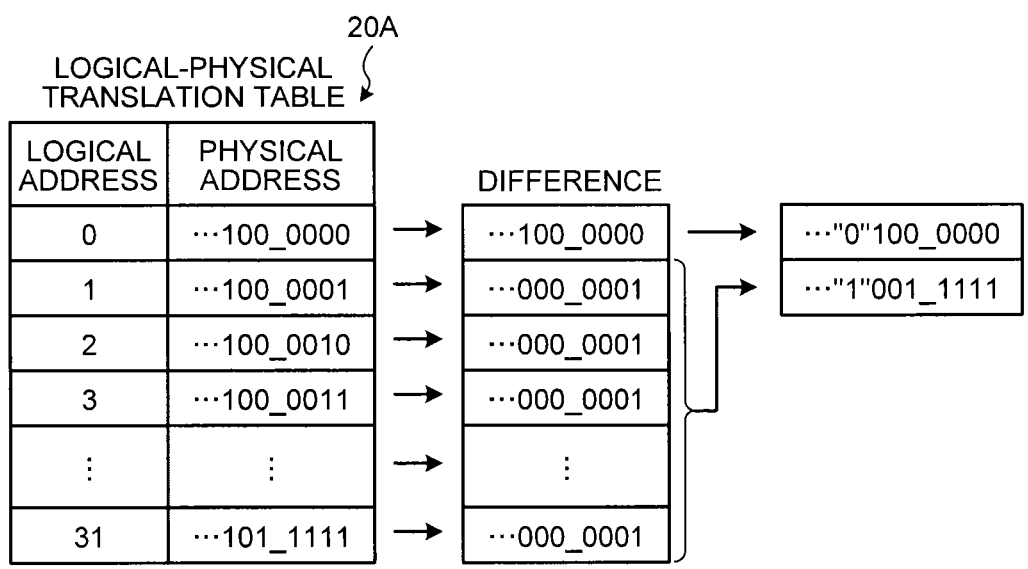
FIG. 4 is a diagram for describing an example of a first compression process of a logical-physical translation table.
Figure 5:
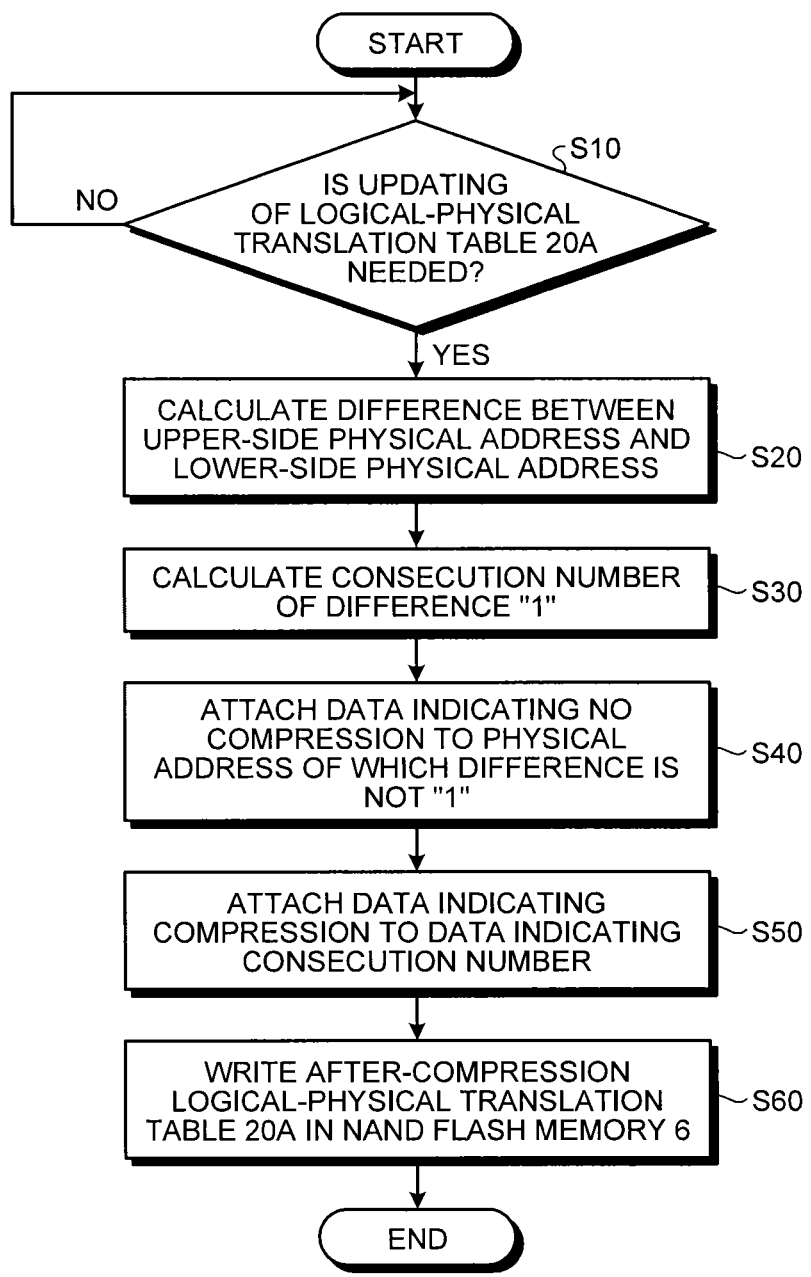
FIG. 5 is a flowchart illustrating a first compression processing procedure of a logical-physical translation table.

FIG. 4 is a diagram for describing an example of a first compression process of a logical-physical translation table. In addition, FIG. 5 is a flowchart illustrating a first compression processing procedure of the logical-physical translation table. FIG. 4 illustrates an example of a compression process on a logical-physical translation table 20A which is an example of the logical-physical translation table 20X. In addition, in the logical-physical translation table 20A illustrated in FIG. 4, the logical address is represented by a decimal number, and the physical address is represented by a binary number.

During the operation, the SSD 1 edits the logical-physical translation table 20A if necessary. In addition, during the operation, the controller 7 of the SSD 1 monitors whether or not updating of the logical-physical translation table 20A into the NAND flash memory 6 is needed (Step S10). If it is not a timing when the updating of the logical-physical translation table 20A is needed (No in Step S10), the controller 7 continues monitoring whether or not the updating is needed. On the other hand, if it is a timing when the updating of the logical-physical translation table 20A is needed (Yes in Step S10), the controller 7 commands the management data compression/decompression processor 5A to perform the compression process on the logical-physical translation table 20A.

The management data compression/decompression processor 5A performs logical compression on the logical-physical translation table 20A by using the point in that the to-be-written data are consecutive data. For example, in the logical-physical translation table 20A, the logical addresses are 0, 1, 2, 3, . . . , 31. In addition, in the logical-physical translation table 20A, the physical addresses corresponding to the logical addresses are consecutive as 100_0000, 100_0001, 100_0010, 100_0011, . . . , 101_1111.

In this case, the management data compression/decompression processor 5A calculates the difference between the X-th physical address (upper-side address) and the (X+1)-th physical address (lower-side address) in the logical-physical translation table 20A over all the Xs (X=0 to 30). In other words, the management data compression/decompression processor 5A calculates the difference between the upper-side physical address and the lower-side physical address among the physical addresses in the logical-physical translation table 20A (Step S20).

Next, the management data compression/decompression processor 5A extracts the difference of which the value is "1" among the differences and calculates how many times "1" consecutively occurs. In other words, the consecution number of the difference "1" is calculated (Step S30). In addition, in the case where, after "1" consecutively occurs, "1" is interrupted once and "1" consecutively occurs again, the consecution number of "1" is calculated for each of the "1" consecution groups.

For example, in the case of the logical-physical translation table 20A illustrated in FIG. 4, "000_0001" is calculated as the difference between the first physical address "100_0000" and the second physical address "100_0001" in the logical-physical translation table 20A. In addition, "000_0001" is calculated as the difference between the second physical address "100_0001" and the third physical address "100_0010", and "000_0001" is calculated as the difference between the third physical address "100_0010" and the fourth physical address "100_0011". Similarly, the difference "000_0001" is calculated as the difference between the 31st physical address "101_1110" (not illustrated) and the 32nd physical address "101_1111".

Therefore, the management data compression/decompression processor 5A calculates the consecution number of the difference "000_0001" corresponding to the difference "1". In other words, the management data compression/decompression processor 5A performs subtraction between the upper-side physical address and the lower-side physical address and represents the result thereof as a length of consecution of "1". Herein, "31" is calculated as the consecution number of the difference "000_0001". In addition, since the difference corresponding to the first physical address "100_0000" may not be calculated, the management data compression/decompression processor 5A does not perform calculation of the difference with respect to the first physical address.

The management data compression/decompression processor 5A attaches "0" indicating that compression is not performed to the most significant bit of the first physical address "100_0000". Therefore, the management data compression/decompression processor 5A converts the physical address "100_0000" into the data "0100_0000". In other words, the data indicating that compression is not performed is attached to the physical address of which the difference is not "1" (Step S40). Next, the management data compression/decompression processor 5A allows the "0" of the logical address to be in correspondence with the after-translation data "0100_0000".

In addition, the management data compression/decompression processor 5A attaches "1" indicating that compression is performed to the most significant bit of "001_1111" indicating "31" which is the consecution number of the difference "000_0001". Therefore, the management data compression/decompression processor 5A converts "001_1111" into "1001_1111". In other words, the management data compression/decompression processor 5A attaches the data indicating that compression is performed to the data indicating the consecution number (Step S50). Next, the management data compression/decompression processor 5A allows "1" of the logical address to be in correspondence with the after-translation data "1001_1111".

After that, the management data compression/decompression processor 5A writes the data where the logical address and the after-translation data are in correspondence with each other (after-compression logical-physical translation table 20A) in the NAND flash memory 6 (Step S60). Therefore, the NAND flash memory 6 stores the data where the "0" of the logical address and the after-translation data "0100_0000" are in correspondence with each other and the data where the "1" of the logical address and the data "1001_1111" indicating the consecution number are in correspondence with each other.

In addition, in FIG. 4, although the case where each physical address of the logical-physical translation table 20A is represented by using 7 bits is described, each physical address of the logical-physical translation table 20A may be represented by using 8 bits or more. Even in this case, empty bits of the most significant bit side of each physical address are used to store the information indicating that compression is performed or the information indicating that compression is not performed.

In the case where the compressed the logical-physical translation table 20A is read from the NAND flash memory 6, the management data compression/decompression processor 5A performs the decompression process on the compressed logical-physical translation table 20A. For example, in the case where the compressed data "0100_0000" and "1001_1111" illustrated in FIG. 4 are decompressed, the management data compression/decompression processor 5A reads data in units of 8 bits.

First, the data "0100_0000" are read. The management data compression/decompression processor 5A reads the first 1 bit of the read data. Herein, since the first 1 bit of "0100_0000" is "0", the management data compression/decompression processor 5A determines that the data is not compressed data. Therefore, the remaining 7 bit data "100_0000" are expanded as the physical address into the management information volatile memory 8 of the RAM 4.

Next, the management data compression/decompression processor 5A reads the following 8 bits. Herein, "1001_1111" is read. Since the first 1 bit of "1001_1111" is "1", the management data compression/decompression processor 5A determines that the data is compressed data. Next, the management data compression/decompression processor 5A reads the remaining 7-bit data. The remaining 7 bits are "001_1111", which represents 31 as a decimal number. Therefore, the management data compression/decompression processor 5A increases the first data "100_0000", which is not compressed, by "000_0001" 31 times. Therefore, the same data as those of the logical-physical translation table 20A illustrated in FIG. 4 are expanded into the management information volatile memory 8 of the RAM 4.

(Second Compression Process of Logical-Physical Translation Table)

Figure 6:
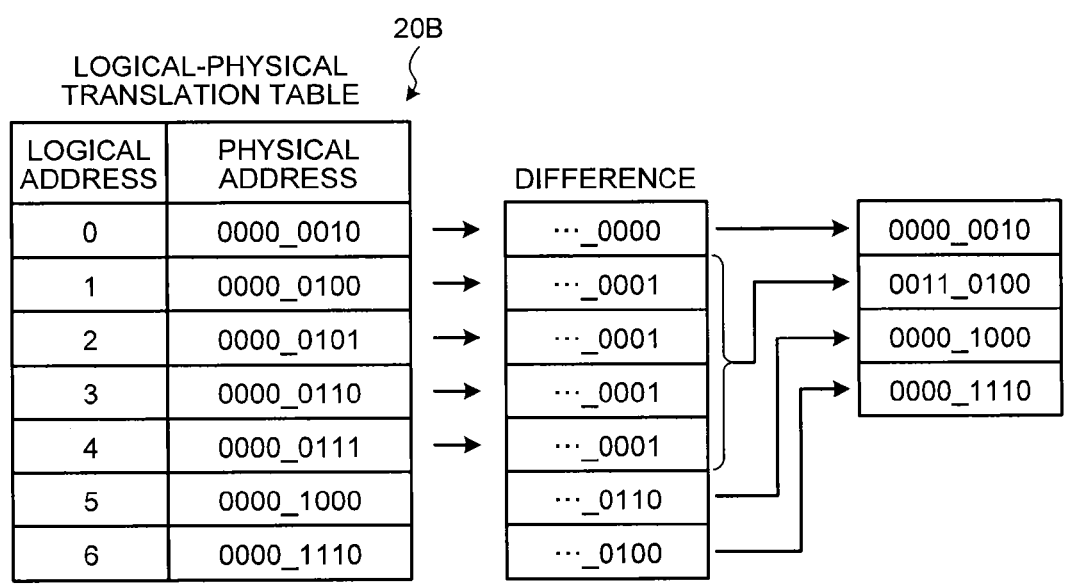
FIG. 6 is a diagram for describing an example of a second compression process of a logical-physical translation table.
Figure 7:
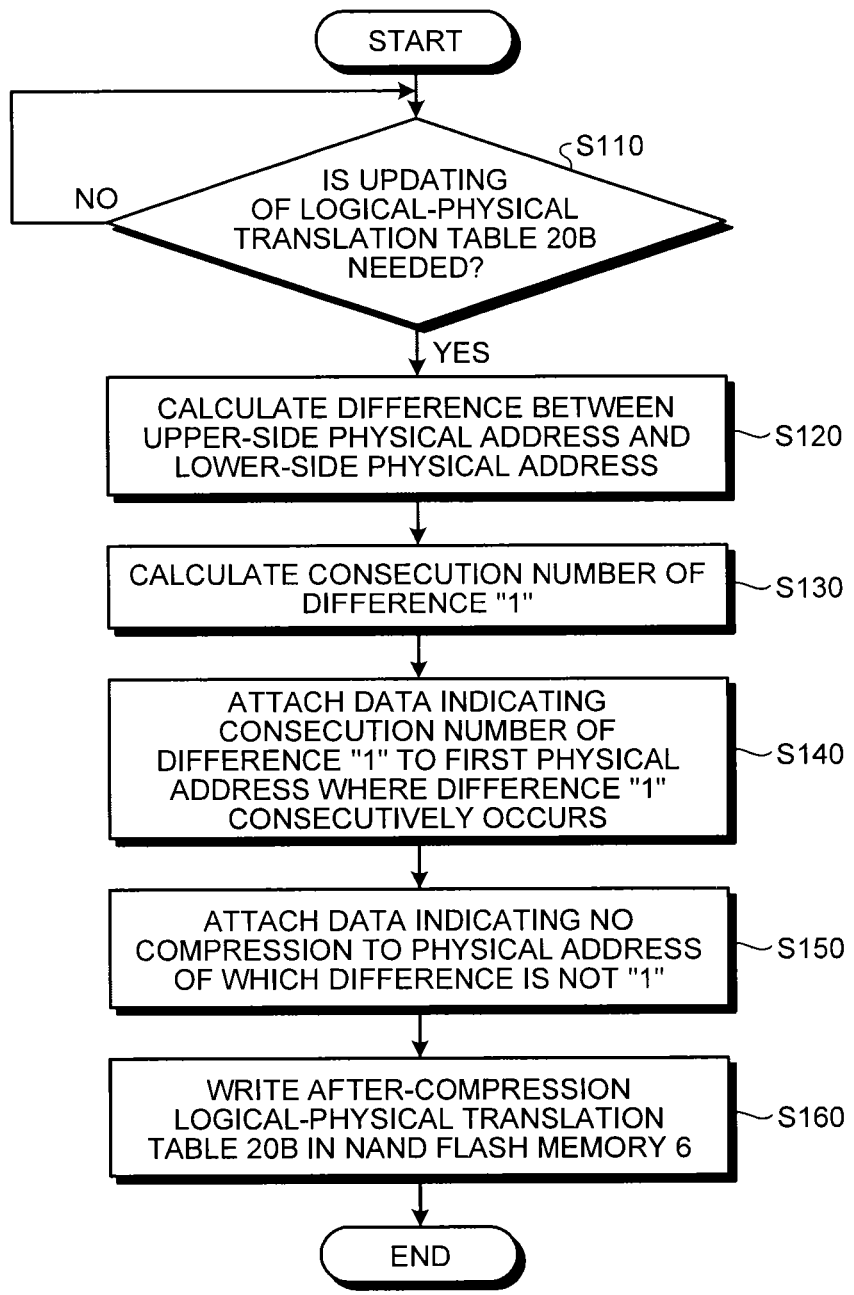
FIG. 7 is a flowchart illustrating a second compression processing procedure of a logical-physical translation table.

FIG. 6 is a diagram for describing an example of a second compression process of a logical-physical translation table. In addition, FIG. 7 is a flowchart illustrating a second compression processing procedure of the logical-physical translation table. In addition, with respect to the same processes of the second compression process as those of the first compression process, the description thereof will not be provided. Steps S110 to S130 of the second compression process are the same as Steps S10 to S30 of the first compression process. In addition, FIG. 6 illustrates an example of a compression process on a logical-physical translation table 20B which is an example of the logical-physical translation table 20X. In addition, in the logical-physical translation table 20B illustrated in FIG. 6, the logical address is represented by a decimal number, and the physical address is represented by a binary number.

In addition, in the logical-physical translation table 20B, although each physical address is represented by using 8 bits, each physical address may be represented by using the least significant bits without using the most significant 1 bit or more. Herein, the case where the most significant 4 bits remain and each physical address is represented by using the least significant 8 bits will be described.

In this case, the management data compression/decompression processor 5A calculates the difference between the X-th physical address (upper-side address) and the (X+1)-th physical address (lower-side address) in the logical-physical translation table 20B over all the Xs (X=0 to 5). Next, the management data compression/decompression processor 5A extracts the difference of which the value is "1" among the differences and calculates how many times "1" consecutively occurs. In other words, after the consecution number of the difference "1" is calculated (Step S130), the management data compression/decompression processor 5A attaches the data indicating the consecution number of the difference "1" to the leading address among the addresses where the difference "1" consecutively occurs (Step S140). In addition, in the case where, after "1" consecutively occurs, "1" is interrupted once and "1" consecutively occurs again, the consecution number of "1" is calculated for each of the "1" consecution groups.

For example, in the case of the logical-physical translation table 20B illustrated in FIG. 6, the difference "0001" is calculated as the difference between the upper-side address and each of the physical addresses "0100" to "0110" in the logical-physical translation table 20B. Next, the management data compression/decompression processor 5A calculates the consecution number of the difference "0001". Herein, "4" is calculated as the consecution number of the difference "0001". The management data compression/decompression processor 5A attaches the data indicating the consecution number of the difference "0001" to the first physical address "0100" having the difference "0001". More specifically, "0011" indicating the consecution number of 4 is represented by using 4 bits as upper bits from the physical address "0100". In other words, "0011" indicating the consecution number of 4 is attached to the upper bit side of the physical address "0100", so that the data "0011_0100" is generated.

Since the difference corresponding to the first physical address "0010" may not be calculated, the management data compression/decompression processor 5A does not perform calculation of the difference with respect to the first physical address. In this case, the 4 bits as upper bits from the physical address "0010" is set to "0000". Therefore, the physical address corresponding to the logical address 0 becomes "0000_0010".

In addition, with respect to the physical address "0000_1000" corresponding to the logical address 5, since the difference with respect to the upper-side address is not "0001", the 4 bits as upper bits from the physical address "1000" is set to "0000". Therefore, the physical address corresponding to the logical address 5 becomes "0000_1000". Similarly, with respect to the physical address "0000_1110" corresponding to the logical address 6, since the difference with respect to the upper-side address is not "0001", the 4 bits as upper bits from the physical address "1110" is set to "0000". Therefore, the physical address corresponding to the logical address 6 becomes "0000_1110". In this manner, the management data compression/decompression processor 5A attaches the data indicating that compression is not performed to the physical address of which the difference is not "1" (Step S150).

Next, the management data compression/decompression processor 5A allows the logical address to be in correspondence with the after-translation data. More specifically, the management data compression/decompression processor 5A allows the "0" of the logical address to be in correspondence with the after-translation data "0000_0010". In addition, the management data compression/decompression processor 5A allows the "1" of the logical address to be in correspondence with the after-translation data "0011_0100". In addition, the management data compression/decompression processor 5A allows the "5" of the logical address to be in correspondence with the after-translation data "0000_1010" and allows the "6" of the logical address to be in correspondence with the after-translation data "0000_1110".

With respect to the numerical values indicated as the most significant bits by using the empty bits, for example, in the case where the empty bits are 4 bits, the numerical values are 0 to 15. Therefore, in the case where the consecution number of the difference "1" is 15 or more, the physical addresses are partitioned into 15-bit physical addresses. For example, in the case where the difference "1" consecutively occurs in the logical addresses "1" to "30", the physical addresses corresponding to the logical addresses "1" to "15" are considered to be one physical address group, and the physical addresses corresponding to the logical addresses "16" to "30" are considered to be one physical address group. In this manner, the management data compression/decompression processor 5A inserts partitions into the physical addresses, of which the difference "1" with respect to the upper-side address consecutively occurs, by using the numerical values (herein, 15 bits since the empty bits are 4 bits) indicated as the most significant bits.

After that, the management data compression/decompression processor 5A writes the data where the logical address and the after-translation data are in correspondence with each other (after-compression logical-physical translation table 20B) in the NAND flash memory 6 (Step S160). Therefore, the NAND flash memory 6 stores the data where the logical address and the after-translation data are in correspondence with each other.

In the case where the compressed logical-physical translation table 20B is read from the NAND flash memory 6, the management data compression/decompression processor 5A performs the decompression process on the compressed logical-physical translation table 20B. For example, in the case where the compressed data "0000_0010", "0011_0100", "0000_1010", and "0000_1110" illustrated in FIG. 6 are decompressed, the management data compression/decompression processor 5A reads the data in units of 8 bits.

For example, first, the data "0000_0010" are read. The management data compression/decompression processor 5A reads the first 4 bits of the read data. Herein, since the first 4 bits are "0000", the management data compression/decompression processor 5A determines that the data is not compressed data. Therefore, the remaining 4-bit data "0010" are expanded as the physical address in the management information volatile memory 8 of the RAM 4.

In addition, the management data compression/decompression processor 5A reads the following 8 bits. Herein, "0011_0100" is read. Since the first 4 bits of "0011_0100" is "0011", the management data compression/decompression processor 5A determines that the data is compressed data and determines that the difference "0" consecutively occurs 4 times. Next, the management data compression/decompression processor 5A increases "0100" by "0001" three times. Similarly, as the physical addresses, "1010" and "1110" are decompressed. Therefore, the same data as those of the logical-physical translation table 20B illustrated in FIG. 6 are expanded into the management information volatile memory 8 of the RAM 4.

In this manner, in the first and second compression processes, the physical addresses are converted by using the consecution number of the difference "1", the data compression of the physical addresses can be performed. Therefore, the data compression of the logical-physical translation tables 20A and 20B can be performed. In this manner, the data sizes of the logical-physical translation tables 20A and 20B in the management information volatile memory 8 of the RAM 4 are reduced, it is possible to shorten the write time of writing data in the NAND flash memory 6 and the read time of reading data from the NAND flash memory 6. In addition, since the data sizes of the logical-physical translation tables 20A and 20B are reduced, it is possible to reduce the memory size of the NAND flash memory 6.

In addition, in FIG. 6, although the case where the most significant 4 bits of each physical address of the logical-physical translation table 20B are empty is described, 3 bits or less or 5 bits or more may be similarly used for the case where the most significant 3 bits or less or 5 bit or more of each physical address are empty.

In addition, in the embodiment, although the compression of the logical-physical translation tables 20A and 20B is performed by representing the consecution number of the difference "1", the compression of the logical-physical translation tables 20A and 20B may be performed by representing the consecution number of the difference "0". The difference "0" represents the case where the same data consecutively occur. For example, there is a case where an invalid value indicating non-written data is inserted into a physical address. In addition, in many cases, non-written data consecutively occur in a physical address.

(Third Compression Process of Logical-Physical Translation Table)

Figure 8:
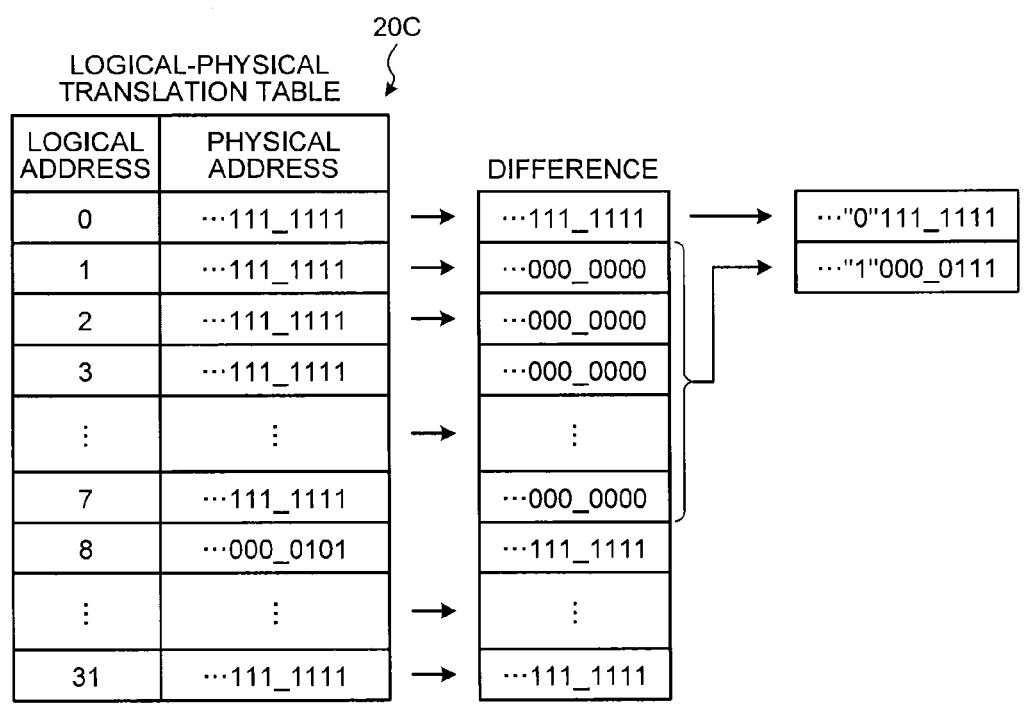
FIG. 8 is a diagram for describing an example of a third compression process of a logical-physical translation table.

FIG. 8 is a diagram for describing an example of a third compression process of a logical-physical translation table. FIG. 8 illustrates an example of a compression process on a logical-physical translation table 20C which is an example of the logical-physical translation table 20X. In addition, in the logical-physical translation table 20C illustrated in FIG. 8, the logical address is represented by a decimal number, and the physical address is represented by a binary number. In addition, since the third compression process is the same as the first compression process in terms of a processing procedure, description of the third compression processing procedure will not be provided herein.

For example, in the logical-physical translation table 20C, the logical address is 0, 1, 2, 3, . . . , 31. In addition, in the logical-physical translation table 20C, many physical addresses among the physical addresses corresponding to the logical addresses are "111_1111", which consecutively occurs in the logical-physical translation table 20C. The "111_1111" is, for example, invalid data or the like.

In this case, the management data compression/decompression processor 5A calculates the difference between the X-th physical address (upper-side address) and the (X+1)-th physical address (lower-side address) in the logical-physical translation table 20C over all the Xs (X=0 to 30). Next, the management data compression/decompression processor 5A extracts the difference of which the value is "0" among the differences and calculates how many times "0" consecutively occurs. In addition, in the case where, after "0" consecutively occurs, "0" is interrupted once and "0" consecutively occurs again, the consecution number of "0" is calculated over each of the "0" consecution group.

For example, in the case of the logical-physical translation table 20C illustrated in FIG. 8, "000_0000" is calculated as the difference between the first physical address "111_1111" and the second physical address "111_1111" in the logical-physical translation table 20C. Similarly, the difference "000_0000" is calculated as the difference with respect to each of the second to eighth physical addresses.

After that, the management data compression/decompression processor 5A calculates the consecution number of the difference "000_0000" corresponding to the difference "0". In other words, the management data compression/decompression processor 5A performs subtraction between the upper-side physical address and the lower-side physical address and represents the result thereof as a length of consecution of "0". Herein, "7" is calculated as the consecution number of the difference "000_0000". In addition, since the difference corresponding to the first physical address "111_1111" may not be calculated, the management data compression/decompression processor 5A does not perform calculation of the difference with respect to the first physical address.

After that, the physical address is compressed through the same process as that of the case of the logical-physical translation table 20A. In other words, the management data compression/decompression processor 5A attaches "0" indicating that compression is not performed to the most significant bit of the first physical address "111_1111". Therefore, the management data compression/decompression processor 5A converts the physical address "111_1111" into the data "0111_1111". Next, the management data compression/decompression processor 5A allows the "0" of the logical address to be in correspondence with the after-translation data "0111_1111".

In addition, the management data compression/decompression processor 5A attaches "1" indicating that compression is performed to the most significant bit of "000_0111" indicating "7" which is the consecution number of the difference "000_0000". Therefore, the management data compression/decompression processor 5A converts the "000_0111" into the "1000_0111". Next, the management data compression/decompression processor 5A allows the "1" of the logical address to be in correspondence with the after-translation data "1000_0111".

After that, the management data compression/decompression processor 5A writes the data where the logical address and the after-translation data are in correspondence with each other (after-compression logical-physical translation table 20C) in the NAND flash memory 6. Therefore, the NAND flash memory 6 stores the data where the logical address and the after-translation data are in correspondence with each other.

In this manner, in the third compression process, the physical address is converted into the data using the consecution number of the difference "0", so that the data compression of the physical address can be performed. Therefore, the data compression of the logical-physical translation table 20C can be performed.

In addition, in FIG. 8, although the case where each physical address of the logical-physical translation table 20C is represented by using 7 bits is described, each physical address of the logical-physical translation table 20C may be represented by using 8 bit or more. Even in this case, empty bits of the most significant bit side of each physical address are used to store the information indicating that compression is performed or the information indicating that compression is not performed. In this manner, in the SSD 1, the compression size may be variable.

As a method of managing the logical-physical translation table, there is a method of managing the logical-physical translation table, for example, in two stages of track and cluster. In this method, as the management unit of the logical-physical translation table is fine, the size of the logical-physical translation table is increased. Therefore, two logical-physical translation tables (track: large, cluster: small) having different management units are prepared, and if the number of clusters is increased, the consecutive clusters are collected through defragmentation to be managed as a track. Therefore, if the clusters corresponding to the size of the track consecutively occur, the clusters can be managed as a track. In this method, if the clusters which are disposed separately are to be defragmented and managed as a track, the clusters corresponding to the track size need to be consecutively arranged again.

However, in the SSD 1 according to the embodiment, if there are consecutive clusters, the clusters are compressed, so that the size of the logical-physical translation table 20X can be reduced. Therefore, even in the case where there is no room for collecting the clusters corresponding to the track size at one time, the clusters can be collected little by little, so that the size of the logical-physical translation table 20X can be reduced little by little. In this manner, in the SSD 1, the defragmentation can be performed step by step. Therefore, in the SSD 1, the logical-physical translation table 20X can be compressed in a fine unit.

In addition, in the embodiment, although the case where the logical-physical translation table 20X using translation of the logical cluster into the physical cluster is compressed is described, the logical-physical translation table using translation of the physical cluster into the logical cluster may be compressed. In addition, the present invention is not limited to the physical address, the logical address may also be compressed. The logical-physical translation table 20X using translation of the logical cluster into the physical cluster is a lookup logical-physical translation table 20X, and the logical-physical translation table using translation of the physical cluster into the logical cluster is a reverse lookup logical-physical translation table 20X. The lookup logical-physical translation table 20X is a table for searching for the storage position on the NAND flash memory 6 from the logical address (LBA). The reverse lookup logical-physical translation table is a table for searching for the logical address (LBA) from the storage position on the NAND flash memory 6. In addition, the management data compression/decompression processor 5A may further compress the compressed data.

In the SSD 1, the difference between the before-updating management table and the after-updating management table is allowed to be stored in a form of log in the NAND flash memory 6. In the case where the log is to be written in the NAND flash memory 6, the log is compressed, a write time for writing the log in the NAND flash memory 6 and a read time for reading the log from the NAND flash memory 6 can be shortened.

In addition, so as to easily perform the compression during the defragmentation, adjacent logical cluster addresses (LCAs) may be allowed to move to adjacent physical clusters. Therefore, it is possible to easily perform the compression during the defragmentation.

In this manner, according to the first embodiment, since the physical address is converted into the consecution number of the difference "1" or "0", the data compression of the physical address can be performed. Therefore, it is possible to perform the reading and writing of the management table (logical-physical translation tables 20A to 20C) of the non-volatile memory in a short time.

In addition, since an amount of data written in the NAND flash memory 6 is decreased, it is possible to prolong the lifetime of the SSD 1. In addition, since the compression method is simple, the management data compression/decompression processor 5A can be easily implemented with hardware.

(Second Embodiment)

Next, a second embodiment of the present invention will be described with reference to FIGS. 9 to 12. In the second embodiment, the compression process of the cluster management table which manages the valid cluster number in each block is performed.

Figure 9:
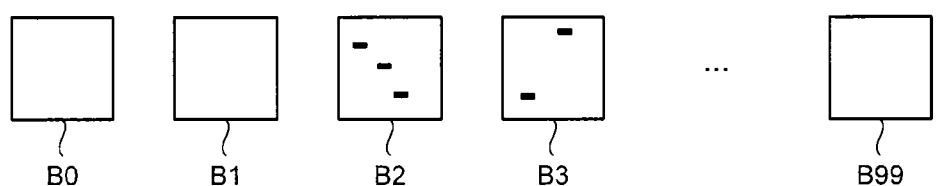
FIG. 9 is a diagram for describing a relation between a block and a valid cluster.

FIG. 9 is a diagram for describing a relation between a block and a valid cluster. In the embodiment, a case where the blocks of the NAND flash memory 6 are 100 blocks of the blocks B0 to B99 will be described.

Each of the blocks B0 to B99 is configured with a plurality of clusters. In addition, the clusters of each of the blocks B0 to B99 include valid clusters or invalid clusters. Among the clusters, the valid cluster is a cluster from which data reading is available, and the invalid cluster is a cluster where the data in the cluster are written in other sites so that reference is removed.

In the SSD 1, a process (compaction) of extracting valid clusters from the blocks B0 to B99 and rewriting in a new block is performed. During the compaction period or the like, a cluster management table is referred.

FIG. 9 illustrates a case where there is no valid cluster in the blocks B0, B1, and B99, a case where there are three valid clusters in the block B2, and a case where there are two valid clusters in the block B3. In the cluster management table 30, the valid cluster number is represented by, for example, 15 bits, and the one upper bit of the 15 bits is empty.

(First Compression Process of Cluster Management Table)

Figure 10:
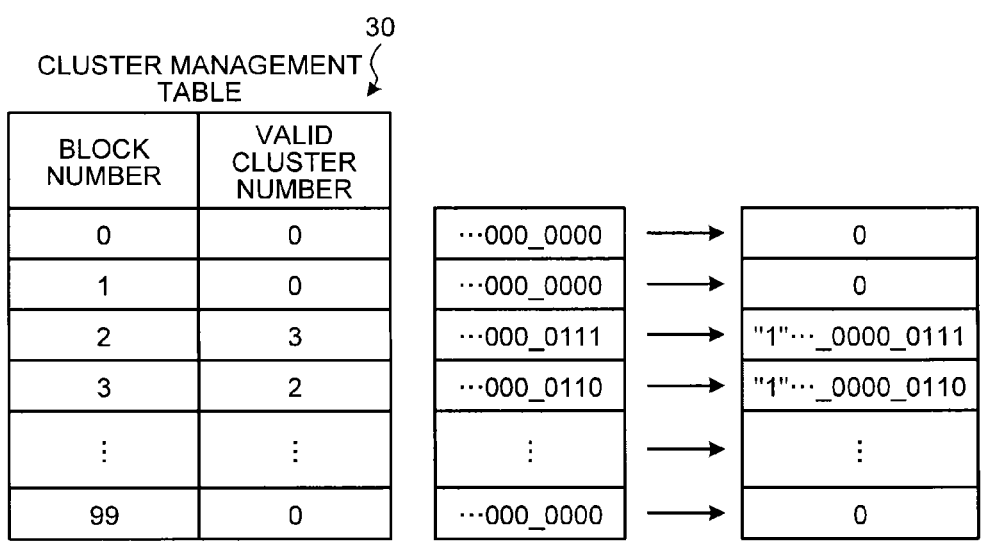
FIG. 10 is a diagram for describing a first compression process of a cluster management table.
Figure 11:
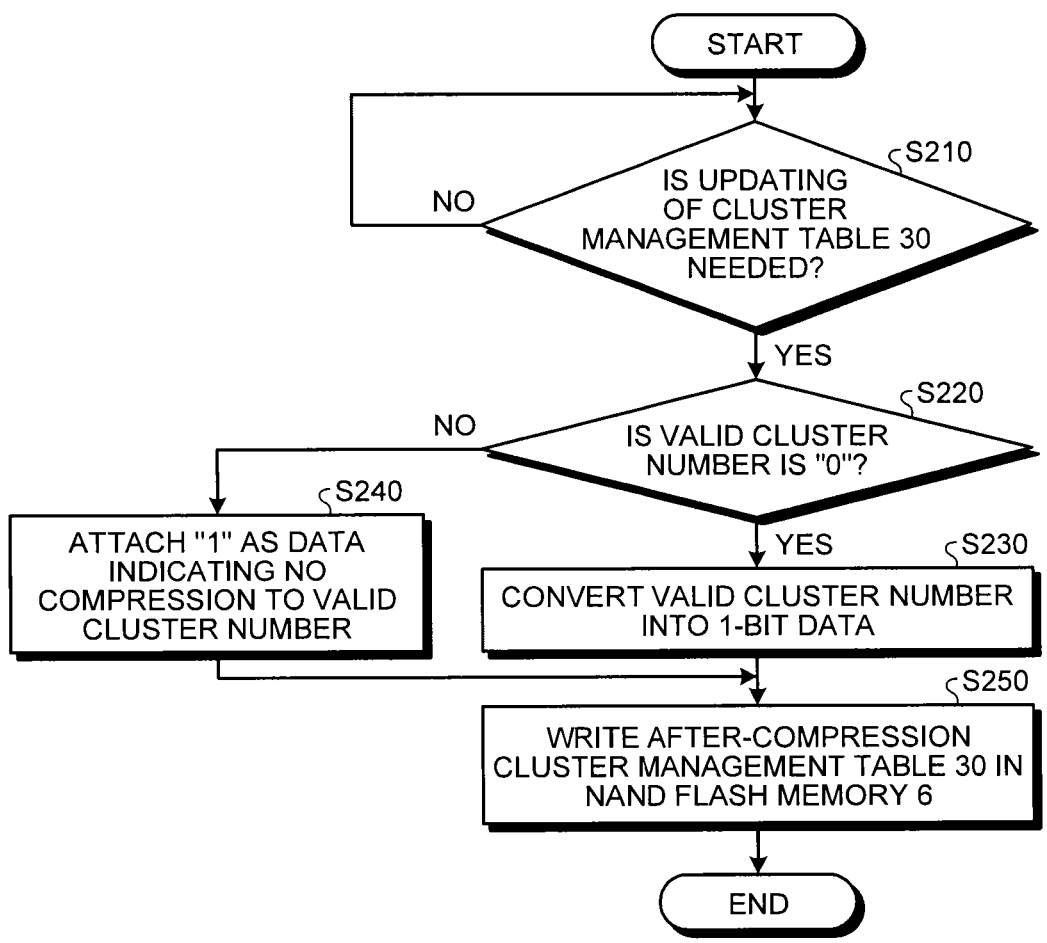
FIG. 11 is a flowchart illustrating a first compression processing procedure of a cluster management table.

FIG. 10 is a diagram for describing a first compression process of a cluster management table. In addition, FIG. 11 is a flowchart illustrating a first compression processing procedure of the cluster management table. FIG. 10 illustrates a cluster management table 30 with respect to the blocks B0 to B99 illustrated in FIG. 9. In the cluster management table 30, the block number and the valid cluster number are in correspondence with each other for each block. For example, with respect to the block B0, the block number is "0", and the valid cluster number is "0". In addition, with respect to the block B1, the block number is "1", and the valid cluster number is "0". In addition, with respect to the block B2, the block number is "2", and the valid cluster number is "3". In addition, with respect to the block B3, the block number is "3", and the valid cluster number is "2".

During the operation, the controller 7 of the SSD 1 monitors whether or not updating of the cluster management table 30 is needed (Step S210). If it is not a timing when the updating of the cluster management table 30 is needed (No in Step S210), the controller 7 continues monitoring the cluster management table 30. On the other hand, if it is a timing when the updating of the cluster management table 30 is needed (Yes in Step S210), the controller 7 commands the management data compression/decompression processor 5A to perform the compression process on the cluster management table 30. The timing of updating of the cluster management table 30 is, for example, a case where there is a change in the valid cluster numbers of the blocks B0 to B99, or the like.

The management data compression/decompression processor 5A determines whether or not the valid cluster number of each block is "0" (Step S220). For example, in the case of the cluster management table 30, the valid cluster number of the block B0 having the block number 0, the valid cluster number of the block B1 having the block number 1, and the valid cluster number of the block B99 having the block number 99 are "0". In the case where the valid cluster number is "0" (Yes in Step S220), the management data compression/decompression processor 5A represents "0" with 1 bit. In other words, the management data compression/decompression processor 5A converts the valid cluster number into 1-bit data (Step S230).

On the other hand, in the case where the valid cluster number is not "0" (No in Step S220), the management data compression/decompression processor 5A represents the valid cluster number as 15 bits. Next, the management data compression/decompression processor 5A attaches the 1 bit indicating "1" as the data indicating that compression is not performed to the upper bit side of the 15 bits indicating the valid cluster number (Step S240). After that, the management data compression/decompression processor 5A writes the after-compression cluster management table 30 in the NAND flash memory 6 (Step S250).

In the case where the compressed cluster management table 30 is read from the NAND flash memory 6, the management data compression/decompression processor 5A performs the decompression process on the compressed cluster management table 30. For example, the compressed data "0", "0", "1 ... _0000_0111", "1 ... _0000_0110", ..., and "0" illustrated in FIG. 10 are decompressed, the management data compression/decompression processor 5A sequentially reads data until "1" occurs. With respect to the data of "0", the management data compression/decompression processor 5A converts "0" into 15-bit data and expands the data in the management information volatile memory 8 of the RAM 4.

On the other hand, in the case where the management data compression/decompression processor 5A detects data of "1", the management data compression/decompression processor 5A expands the 8-bit data following the "1" in the management information volatile memory 8. For example, in the case of "1 ... _0000_0111", since the first bit is "1", it is determined that the following 15 bits are data indicating the valid cluster number. Similarly, in the case of "1 ... _0000_ 0110", since the first bit is "1", it is determined that the following 15 bits are data indicating the valid cluster number. The management data compression/decompression processor 5A converts the data represented by 16 bits into 15 bits and expands the data in the management information volatile memory 8. Therefore, the same data as those of the cluster management table 30 illustrated in FIG. 10 are expands in the management information volatile memory 8.

In this manner, in the embodiment, the data of which the occurrence frequency is high in the RAM 4 are encoded and compressed. Since there is deflection in the valid cluster number, in many cases, the valid cluster number is 0 or the upper limit of the valid cluster number of the block. In the SSD 1, the compression can be effectively performed by using the above tendency.

(Second Compression Process of Cluster Management Table)

Next, a second compression process for a cluster management table will be described. In the second compression process for the cluster management table, the case where the valid cluster number is "0" and the case where the valid cluster number is an upper limit value (fully filed) are the object of compression of the physical address.

Figure 12:
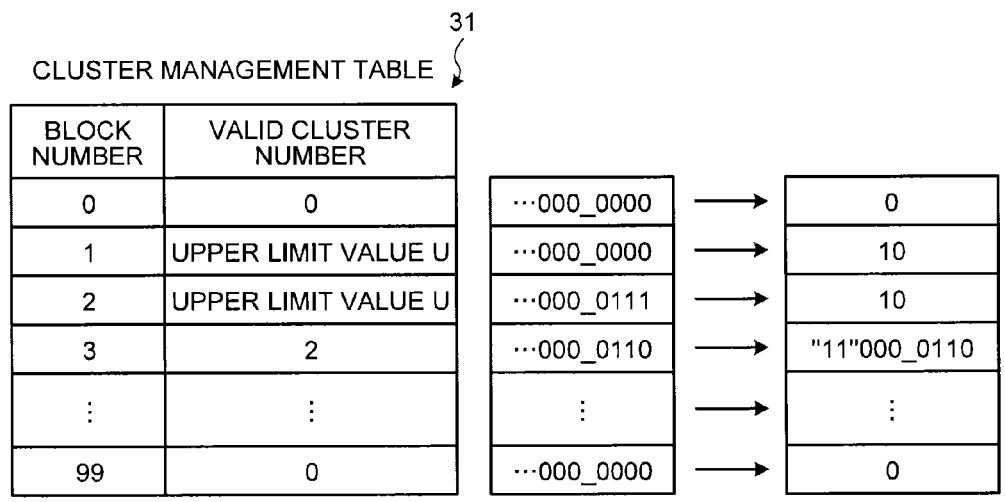
FIG. 12 is a diagram for describing a second compression process of a cluster management table.

FIG. 12 is a diagram for describing a second compression process of a cluster management table. In the cluster management table 31, for example, with respect to the block B0, the block number is "0", and valid cluster number is "0". In addition, with respect to the block B1, the block number is "1", and the valid cluster number is an "upper limit value U". In addition, with respect to the block B2, the block number is "2", and the valid cluster number is an "upper limit value U". In addition, with respect to the block B3, the block number is "3", and the valid cluster number is "2".

The management data compression/decompression processor 5A determines whether or not the valid cluster number of each block is "0". Herein, the valid cluster number of the block B0 having the block number 0 and the valid cluster number of the block B99 having the block number 99 are "0". In the case where the valid cluster number is "0", the management data compression/decompression processor 5A represents "0" by using 1 bit.

In addition, the management data compression/decompression processor 5A determines whether or not the valid cluster number of each block is an "upper limit value U". Herein, the valid cluster number of the block B1 having the block number 1 and the valid cluster number of the block B2 having the block number 2 are "upper limit values U". In the case where the valid cluster number is an "upper limit value U", the management data compression/decompression processor 5A represents "10" by using 2 bits. In other words, the management data compression/decompression processor 5A converts the valid cluster number into 2-bit data.

In addition, in the case where the valid cluster number is neither "0" nor the "upper limit value U", the management data compression/decompression processor 5A represents the valid cluster number by using 15 bits. In addition, the management data compression/decompression processor 5A attaches a bit indicating "11" as data indicating that compression is not performed to the upper bit side of the 15 bits indicating the valid cluster number.

In addition, in the embodiment, although the physical address is represented by 15 bits, the bit number indicating the physical address is not limited to 15 bits. For example, the physical address may be represented by 14 bits or less, and the physical address may be represented by 15 bits or more.

In addition, in the embodiment, although the case where the cluster number is managed for each block is described, the unit of management of data may be any size. For example, a management table for managing a bad-cluster number of each block may be compressed, or a management table for managing a bad-sector number of each page may be compressed. In this manner, the management data compression/decompression processor 5A may compress a management table of storing a correspondence relation between a first data storage unit of the NAND flash memory 6 and a number of valid storage unit, which is a number of valid second data storage units included in the first data storage unit, for each first data storage unit.

In this manner, according to the second embodiment, in the case where the valid cluster number is "0", since the valid cluster number is represented by using 1-bit data, the data compression of the cluster management table 30 can be performed. Therefore, the reading/writing of the management table (cluster management table 30) in the non-volatile memory can be performed in a short time.

(Third Embodiment)

Next, a third embodiment of the present invention will be described with reference to FIGS. 13 and 14. In the third embodiment, a compressed logical-physical translation table 20X is stored in a RAM 4, and if necessary, the compressed logical-physical translation table 20X is written in a NAND flash memory 6. In addition, when the logical-physical translation table 20X is to be used, the logical-physical translation table 20X is decompressed in the RAM 4.

Figure 13:
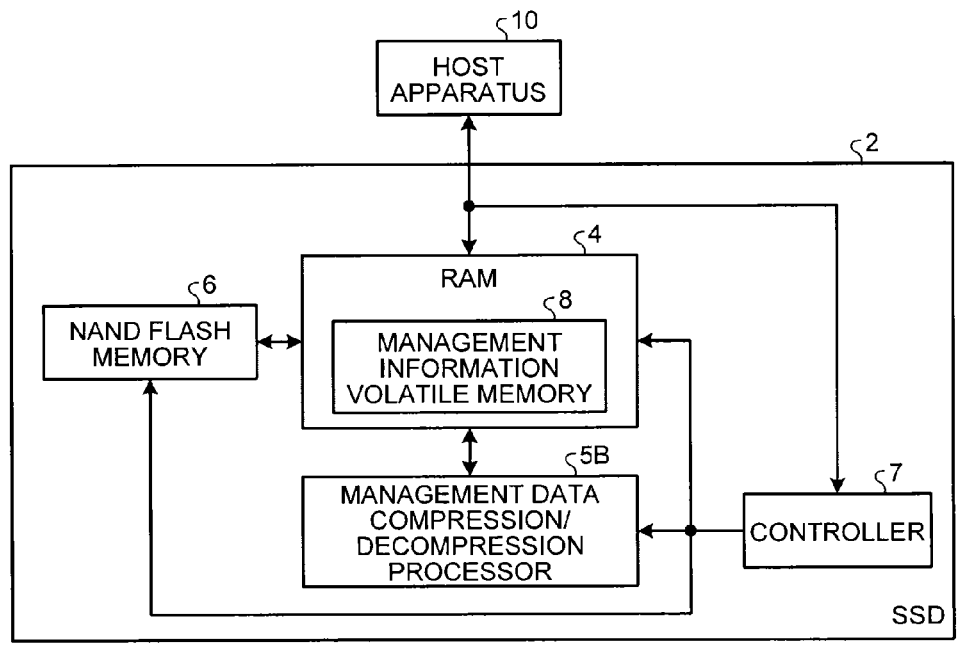
FIG. 13 is a block diagram illustrating an example of a configuration of an SSD according to a third embodiment.

FIG. 13 is a block diagram illustrating an example of a configuration of an SSD according to the third embodiment. The same components of FIG. 13 as the components having the functions in the SSD 1 according to the first embodiment illustrated in FIG. 2 are denoted by the same reference numerals, and description thereof will not be provided.

An SSD 2 as a semiconductor storage device includes a RAM 4 which includes a management information volatile memory 8, a NAND flash memory 6 which actually stores data, a management data compression/decompression processor 5B, and a controller 7.

The RAM 4 of the SSD 2 is connected to a host apparatus 10, the controller 7, the NAND flash memory 6, and the management data compression/decompression processor 5B. The management data compression/decompression processor 5B is connected to the RAM 4 and the controller 7. In addition, the NAND flash memory 6 is connected to the RAM 4 and the controller 7. In addition, the controller 7 is connected to the host apparatus 10, the RAM 4, the NAND flash memory 6, and the management data compression/decompression processor 5B.

Instead of expanding all of various management tables in the RAM 4, the SSD 2 reads a necessary portion of the management tables from the NAND flash memory 6. Next, after the SSD 2 edits a portion of the management table in the RAM 4, the SSD 2 writes the management table in the NAND flash memory 6 at predetermined timing. In other words, in the SSD 2, the RAM 4 is used as a cache.

In the case where there is an decompression command from the controller 7, the management data compression/decompression processor 5B decompresses (expands) the logical-physical translation table 20X of the RAM 4 and returns the logical-physical translation table 20X to the RAM 4. In addition, in the case where there is a compression command from the controller 7, the management data compression/decompression processor 5B compresses the logical-physical translation table 20X of the RAM 4 and returns the logical-physical translation table 20X to the RAM 4.

If the reading of the logical-physical translation table 20X is needed, the controller 7 transmits the decompression command for the logical-physical translation table 20X to the management data compression/decompression processor 5B. In addition, if the reading of the logical-physical translation table 20X is not needed, the controller 7 transmits the compression command for the logical-physical translation table 20X to the management data compression/decompression processor 5B.

Therefore, in the RAM 4, if the reading of the logical-physical translation table 20X is needed, the logical-physical translation table 20X is decompressed in the RAM 4; and if the reading of the logical-physical translation table 20X is not needed, the logical-physical translation table 20X is compressed in the RAM 4. The compression process or decompression process for the logical-physical translation table 20X is the same process as the compression process or decompression process described in the first embodiment.

In the SSD 2, the logical-physical translation table 20X is written in the NAND flash memory 6 at the same timing as that of the SSD 1. At this time, the logical-physical translation table 20X in the compressed state in the RAM 4 is written in the NAND flash memory 6.

Figure 14:
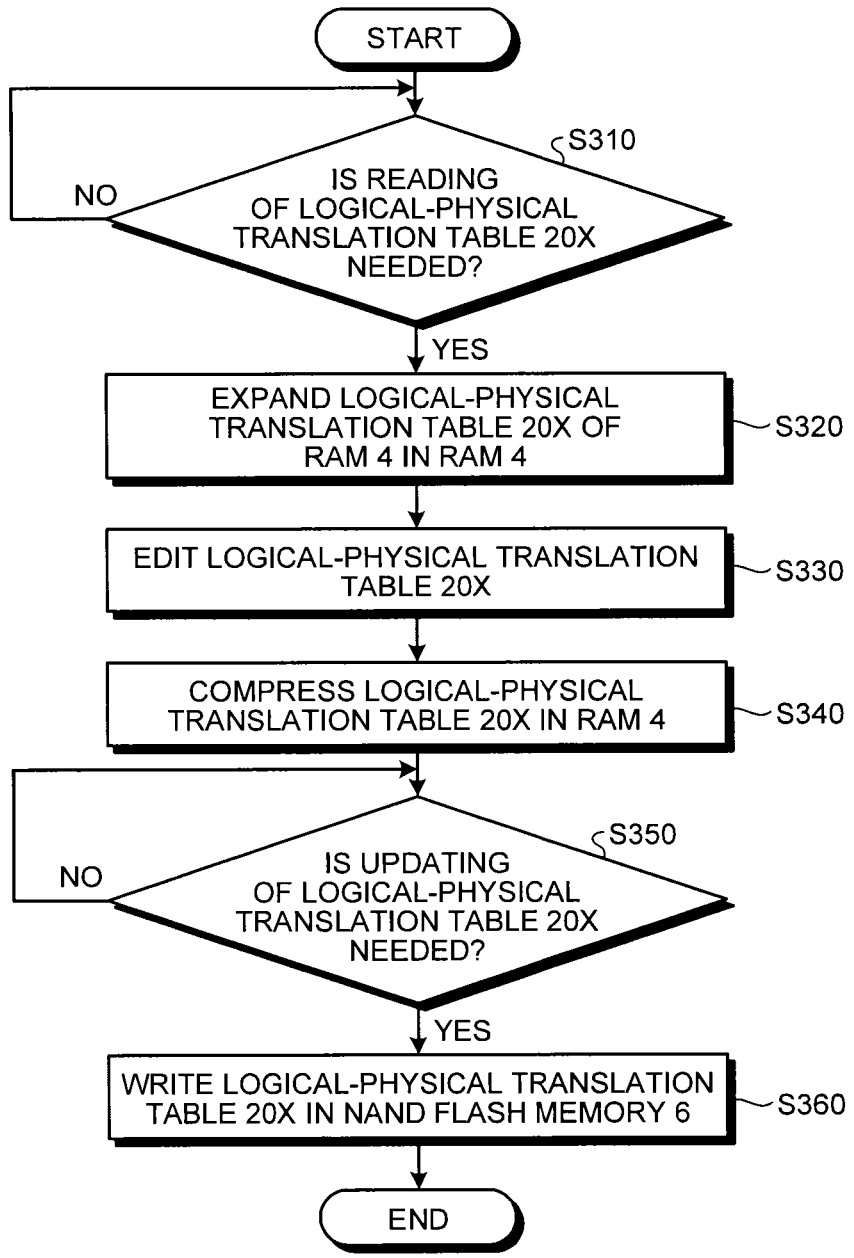
FIG. 14 is a flowchart illustrating a compression/decompression processing procedure of a logical-physical translation table.

FIG. 14 is a flowchart illustrating a compression/decompression processing procedure of a logical-physical translation table. During the operation, the controller 7 of the SSD 2 monitors whether or not the reading of the logical-physical translation table 20X is needed (Step S310). If the reading of the logical-physical translation table 20X is not needed (No in Step S310), the controller 7 continues monitoring whether or not the reading is needed. On the other hand, if the reading of the logical-physical translation table 20X is needed, (Yes in Step S310), the controller 7 commands the management data compression/decompression processor 5B to perform the decompression process on the logical-physical translation table 20X.

Therefore, the management data compression/decompression processor 5B decompresses the logical-physical translation table 20X from the RAM 4 and stores the logical-physical translation table 20X in the RAM 4 (Step S320). After that, if necessary, the logical-physical translation table 20X of the RAM 4 is edited (Step S330). When the editing of the logical-physical translation table 20X is completed, the controller 7 commands the management data compression/decompression processor 5B to perform the compression process on the logical-physical translation table 20X. Therefore, the management data compression/decompression processor 5B compresses the logical-physical translation table 20X of the RAM 4 and stores the logical-physical translation table 20X in the RAM 4 (Step S340).

In addition, the controller 7 of the SSD 2 monitors whether or not updating of the logical-physical translation table 20X into the NAND flash memory 6 is needed (Step S350). If it is not a timing when the updating of the logical-physical translation table 20X is needed (No in Step S350), the controller 7 continues monitoring whether or not the updating exists. On the other hand, if it is a timing when the updating of the logical-physical translation table 20X is needed (Yes in Step S350), the controller 7 writes the compressed logical-physical translation table 20X in the RAM 4 into NAND flash memory 6 (Step S360). After that, the compressed logical-physical translation table 20X is read from the RAM 4 if necessary, and the compressed logical-physical translation table 20X is decompressed, edited and compressed at predetermined timing if necessary.

Even after the SSD 2 according to the embodiment reads the logical-physical translation table 20X in the RAM 4 as a cache, the SSD 2 uses the logical-physical translation table 20X in the compressed state. Therefore, it is possible to store many management tables even in a small capacity of a cache memory. Therefore, in comparison with the case where compression is not performed, it is possible to expand (place) many management tables in the RAM 4 with respect to a reservation amount and a restoration amount of the NAND flash memory 6.

In addition, the SSD 2 stores other management tables such as the compressed cluster management tables 30 and 31 in the RAM 4, and if necessary, the SSD 2 writes the compressed cluster management tables 30 and 31 into the NAND flash memory 6. In this case, when the cluster management tables 30 and 31 are to be used, the cluster management tables 30 and 31 are decompressed in the RAM 4. The compression process or decompression process of the cluster management tables 30 and 31 is similar to as the compression process or decompression process described in the second embodiment.

Figure 15:
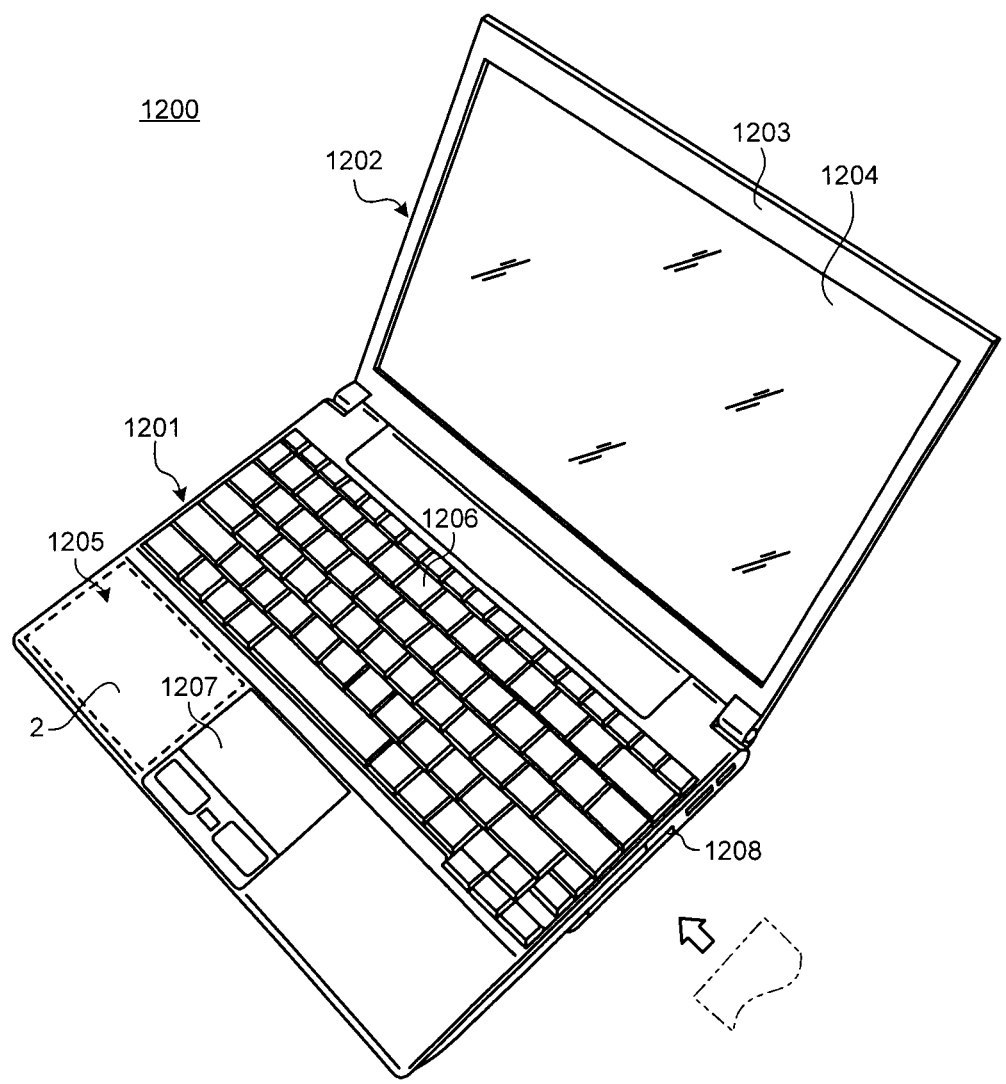
FIG. 15 is a perspective view illustrating an example of a personal computer equipped with an SSD.

FIG. 15 is a perspective view illustrating an example of a personal computer equipped with an SSD. A personal computer 1200 includes the SSD 1 or the SSD 2, a main body 1201, and a display unit 1202. In addition, herein, a case where the personal computer 1200 includes the SSD 2 will be described. The display unit 1202 includes a display housing 1203 and a display apparatus 1204 received in the display housing 1203.

The main body 1201 includes a case 1205, a keyboard 1206, and a touch pad 1207 as a pointing device. A main circuit board, an optical disk device (ODD) unit, a card slot, the SSD 2, and the like are received in the case 1205.

The card slot is installed to be adjacent to a peripheral wall of the case 1205. An opening 1208 is installed to the peripheral wall so as to face the card slot. A user can insert/extract an additional device from an outer portion of the case 1205 through the opening 1208 into/from the card slot.

As a substitute for a hard disk drive (HDD) of the related art, the SSD 2 may be used in a state where the SSD 2 is mounted within the personal computer 1200, or the SSD 2 may be used as an additional device in a state where the SSD 2 is inserted into the card slot installed to the personal computer 1200.

Figure 16:
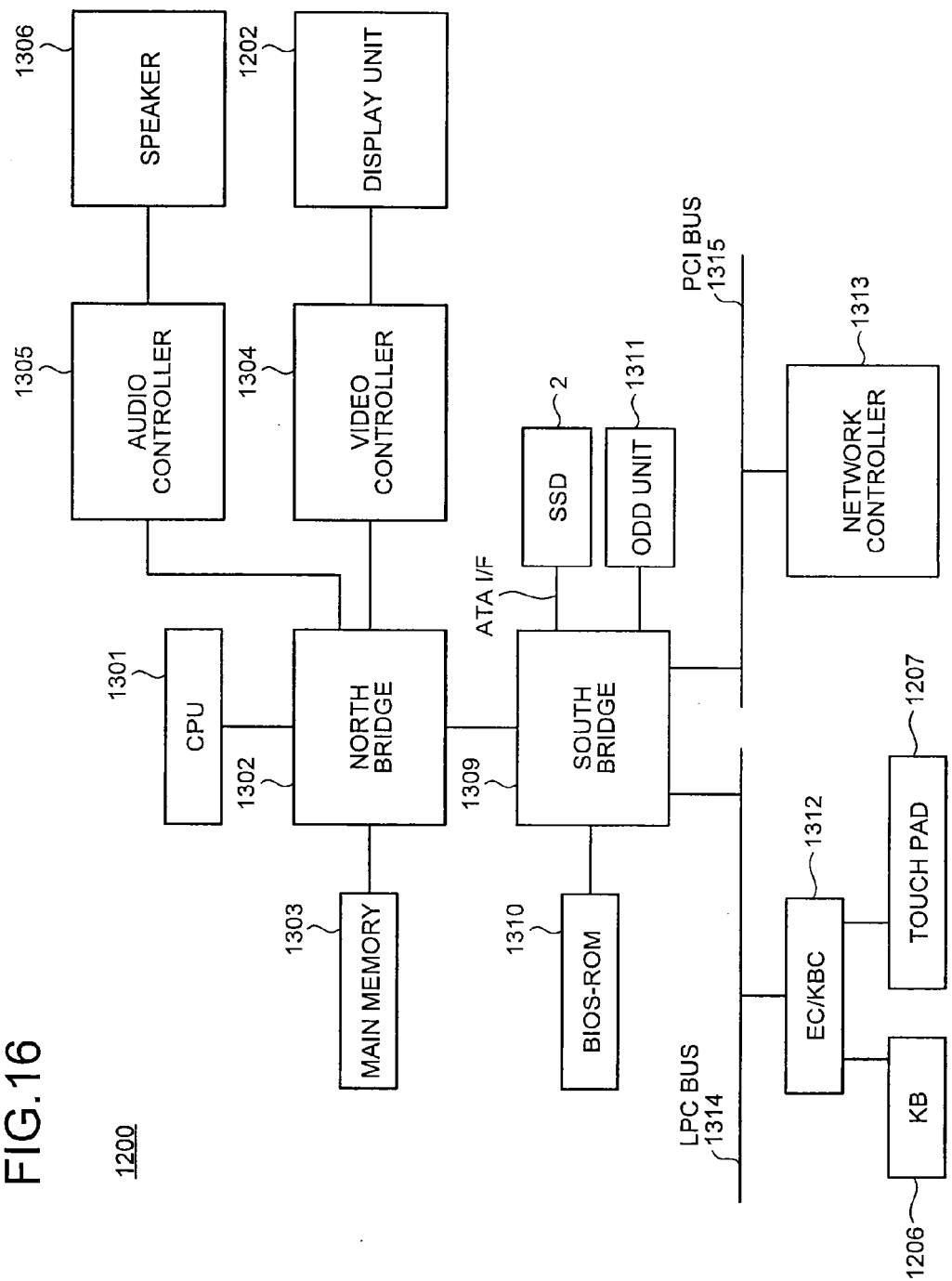
FIG. 16 is a diagram illustrating an example of a configuration of a system of a personal computer equipped with an SSD.

FIG. 16 is a diagram illustrating an example of a configuration of a system of a personal computer equipped with an SSD. The personal computer 1200 includes a CPU 1301, a north bridge 1302, a main memory 1303, a video controller 1304, an audio controller 1305, a south bridge 1309, a BIOS-ROM 1310, an SSD 2, an ODD unit 1311, an embedded controller/keyboard controller (EC/KBC) IC 1312, a network controller 1313, and the like The CPU 1301 is a processor installed so as to control operations of the personal computer 1200 and executes an operating system (OS) which is loaded from the SSD 2 onto the main memory 1303. In addition, in the case where the ODD unit 1311 allows a loaded optical disc to execute at least one of the reading process and the writing process, the CPU 1301 executes the process.

In addition, the CPU 1301 also executes a system BIOS (Basic Input Output System) stored in the BIOS-ROM 1310. In addition, the system BIOS is a program for controlling hardware of the personal computer 1200.

The north bridge 1302 is a bridge device which connects a local bus of the CPU 1301 and the south bridge 1309. A memory control for controlling access to the main memory 1303 is built in the north bridge 1302.

In addition, the north bridge 1302 has a function of executing communication to the video controller 1304 and communication to the audio controller 1305 through an accelerated graphics port (AGP) bus and the like.

The main memory 1303 temporarily stores programs or data so as to function as a work area of the CPU 1301. The main memory 1303 is configured with, for example, DRAM. The video controller 1304 is a video play controller for controlling the display unit 1202 used as a display monitor of the personal computer 1200.

The audio controller 1305 is an audio play controller for controlling the speaker 1306 of the personal computer 1200. The south bridge 1309 controls devices on a low pin count (LPC) bus 1314 and devices on a peripheral component interconnect (PCI) bus 1315. In addition, the south bridge 1309 controls the SSD 2 which is a storage device for storing various types of software and data through an ATA interface.

The personal computer 1200 performs access to the SSD 2 through an ATA interface (I/F) in units of a sector. A write command, a read command, a flash command, and the like are input to the SSD 2.

In addition, the south bridge 1309 has a function of controlling access to the BIOS-ROM 1310, and the ODD unit 1311. The EC/KBC 1312 is a one-chip microcomputer where an embedded controller for power management and a keyboard controller for controlling a keyboard (KB) 1206 and a touch pad 1207 are integrated. The EC/KBC 1312 has a function of turning ON and OFF the power of the personal computer 1200 according to user's manipulation of a power button. The network controller 1313 is a communication device which executes communication with an external network, for example, the Internet or the like.

The personal computer 1200 performs supplying power to the SSD 2, and issues a standby request to the SSD 2. Even in the case where the power supplied from the personal computer 1200 to the SSD 2 is abnormally disconnected, it is possible to prevent the occurrence of write error in advance.

In addition, the SSD 1 or the SSD 2 may be installed in computers or electronic apparatuses rather than the personal computer 1200.

In this manner, according to the third embodiment, the RAM 4 stores the management table in a compressed state, and when the reading of the management table is needed, the management table is decompressed in the RAM 4. Therefore, it is possible to efficiently utilize a storage area of the RAM 4. Accordingly, many management tables can be loaded on the RAM 4.

In this manner, according to the first to third embodiments, it is possible to perform reading and writing of a management table in non-volatile memory in a short time.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
   a non-volatile memory configured to store management information, the management information storing, for each management unit of data, a correspondence relation between a logical address designated by a host apparatus and a physical address on the non-volatile memory;
   a volatile memory configured to temporarily store the management information;
   a controller configured to:
      load the management information stored in the non-volatile memory into the volatile memory at a first timing;
      store the management information loaded in the volatile memory into the non-volatile memory at a second timing;
      perform data transmission through the volatile memory between the host apparatus and the non-volatile memory; and
      perform, based on the management information, data management while updating, in the volatile memory and the non-volatile memory, the management information; and
   a compression/decompression processor configured to compress the management information in the case where a first condition is satisfied and to decompress the compressed management information in the case where a second condition is satisfied,
   wherein the compression/decompression processor compresses an address group by replacing data corresponding to a plurality of addresses in the address group with new data, the address group being a group in the management information, the address group being a group in which, for each management unit of the data, the physical addresses and the logical addresses are arranged,
   wherein the controller is configured to store the compressed management information in the non-volatile memory.

2. The memory system according to claim 1, wherein the compression/decompression processor calculates a consecution number of sequentially consecutive addresses from the address group, and compresses the address group by replacing the consecutive addresses with the new data including first data pattern indicating the consecution number.

3. The memory system according to claim 2, wherein, with respect to a non-compressed address, the compression/decompression processor attaches data indicating that compression is not performed to the non-compressed address, and with respect to a compressed physical address, the compression/decompression processor attaches data indicating that compression is performed to the first data pattern, wherein empty bits of the most significant bit side of each physical address are used to store the data indicating that compression is performed.

4. The memory system according to claim 2, wherein with respect to a non-compressed address, the compression/decompression processor attaches data indicating that compression is not performed to the non-compressed address, and with respect to a compressed physical address, the compression/decompression processor attaches the first data pattern to a leading address of the consecutive addresses, wherein empty bits of the most significant bit side of each physical address are used to store the data indicating that compression is not performed.

5. The memory system according to claim 1, wherein when the management information in the volatile memory is allowed to be stored in the non-volatile memory, the compression/decompression processor compresses the management information, and when the management information in the non-volatile memory is allowed to be brought into the volatile memory, the compression/decompression processor decompresses the management information.

6. The memory system according to claim 1, wherein the compression/decompression processor allows the compressed management information to be stored in the volatile memory, and in the case where reading of the management information is needed, the compression/decompression processor decompresses the management information in the volatile memory, and in the case where the reading of the management information is not needed, the compression/decompression processor compresses the management information in the volatile memory.

7. The memory system according to claim 1, wherein the non-volatile memory is NAND flash memory.

8. A computer comprising:
   a host apparatus;
   a non-volatile memory configured to store management information, the management information storing, for each management unit of data, a correspondence relation between a logical address designated by the host apparatus and a physical address on the non-volatile memory;
   a volatile memory configured to temporarily store the management information;
   a controller configured to:
      load the management information stored in the non-volatile memory into the volatile memory at a first timing;
      store the management information loaded in the volatile memory into the non-volatile memory at a second timing;
      perform data transmission through the volatile memory between the host apparatus and the non-volatile memory; and
      perform, based on the management information, data management while updating, in the volatile memory and the non-volatile memory, the management information; and
   a compression/decompression processor configured to compress the management information in the case where a first condition is satisfied and to decompress the compressed management information in the case where a second condition is satisfied,
   wherein the compression/decompression processor compresses an address group by replacing data corresponding to a plurality of addresses in the address group with new data, the address group being a group in the management information, the address group being a group in which, for each management unit of the data, the physical addresses and the logical addresses are arranged, wherein the controller is configured to store the compressed management information in the non-volatile memory.

9. A data management method comprising:

storing management information in a non-volatile memory, and storing, in a volatile memory at a first timing, the management information, the management information storing, for each management unit of data, a correspondence relation between a logical address designated by a host apparatus and a physical address on the non-volatile memory;

storing, in the non-volatile memory at a second timing, the management information in the volatile memory;

when performing data transmission through the volatile memory between the host apparatus and the non-volatile memory, performing, based on the management information, data management of the volatile memory and the non-volatile memory while updating, in the volatile memory and the non-volatile memory, the management information;

compressing the management information to store the management information in the non-volatile memory in the case where a first condition is satisfied;

decompressing the compressed management information in the case where a second condition is satisfied; and compressing an address group by replacing data corresponding to a plurality of addresses in the address group with new data, the address group being a group in the management information, the address group being a group in which, for each management unit of the data, the physical addresses and the logical addresses are arranged.

10. The data management method according to claim 9, wherein, when compressing the management information, calculating a consecution number of sequentially consecutive addresses from the address group, and compressing the address group by replacing the consecutive addresses with the new data including first data pattern indicating the consecution number.

11. The data management method according to claim 10, wherein during the compressing of the management information, with respect to a non-compressed address, data indicating that compression is not performed is attached to the non-compressed address, and with respect to a compressed address, data indicating that compression is performed is attached to the first data pattern, wherein empty bits of the most significant bit side of each physical address are used to store the data indicating that compression is performed.

12. The data management method according to claim 10, wherein during the compressing of the management information, with respect to a non-compressed address, data indicating that compression is not performed is attached to the non-compressed address, and with respect to a compressed physical address, the first data pattern is attached to a leading address of the consecutive addresses, wherein empty bits of the most significant bit side of each physical address are used to store the data indicating that compression is not performed.

13. The data management method according to claim 9, wherein during the compressing of the management information, when the management information in the non-volatile memory is allowed to be stored in the non-volatile memory, the management information is compressed, and when the management information in the non-volatile memory is allowed to be brought into the non-volatile memory, the management information is decompressed.

14. The data management method according to claim 9, wherein during the compressing of the management information, the compressed management information is allowed to be stored in the non-volatile memory, and in the case where reading of the management information is needed, the management information is decompressed in the non-volatile memory, and in the case where the reading of the management information is not needed, the management information is compressed in the non-volatile memory.

* * * * *